Patented Jan. 15, 1952

2,582,845

UNITED STATES PATENT OFFICE 2,582,845

MEANS FOR REDUCING LOCAL ACTION IN LEAD ACID STORAGE BATTERIES

Harold Purves Murphy, Ridley Park, Pa., assignor to The Electric Storage Battery Company, a corporation of New Jersey No Drawing. Application November 28, 1945, Serial No. 631,471

5 Claims. (Cl. 136—153)

This invention relates to improvements in storage batteries of the lead sulphuric acid type and more particularly such batteries assembled with electrodes having grids containing antimony.

In lead sulphuric acid type storage batteries it is customary to employ a lead-antimony alloy for the grid or supporting structure of the positive and negative electrode. It has been observed that the antimony in the electrodes tends to leach out and during charging, the antimony thus freed, deposits on the negative electrode. This deposit of antimony causes a self discharge of the negative electrode which is commonly called "local action." It is the object of this invention to reduce or minimize the local action resulting from such deposition of antimony.

In accordance with this invention a component is introduced into the cell in contact with the electrolyte which will have the effect of liberating antimony deposited on the negative electrode or in contact with the electrolyte. The component introduced has the effect of combining with the free or excess antimony in such a way that during charge the antimony is removed from the battery in the form of stibine gas, the component returning to its original form in contact with the electrolyte to be available for further antimony liberation.

It has been discovered that the incorporation in a lead sulphuric acid storage cell, having plate grids containing antimony, of a small quantity of cadmium or zinc in contact with the electrolyte will have a marked effect in reducing the local action and consequent loss of capacity of the negative electrode while standing on open circuit. The small quantity of cadmium or zinc appears to stimulate the production of stibine and thereby rids the cell of excess or free antimony at the negative electrode thereby reducing the local action or loss of capacity of this electrode on stand.

In one embodiment of this invention there is introduced into the electrolyte, either prior to the initial charge or at some later period in the operation of the cell, a small quantity of a soluble salt of cadmium such as cadmium sulphate. It has been found that a quantity of soluble cadmium salt equivalent to from 0.1 to 50.0 milligrams of metallic cadmium per square inch of negative plate surface will cause appreciable reduction in the local action at the negative electrode. The recommended range for optimum results is between 5.0 and 10.0 milligrams of metallic cadmium per square inch of negative plate surface. This latter range produces an electrolyte having a cadmium concentration of 5 milligrams to 600 milligrams per 100 cc. of dilute sulphuric acid, depending on the amount of acid per unit of negative surface area. Smaller quantities will produce some reduction in local action, and quantities exceeding 10 milligrams per square inch of negative plate surface produce very little additional improvement. Furthermore, the metallic cadmium deposited on the negative electrode during charge is recombined with the sulphuric acid while standing on open circuit. This chemical reaction is accompanied by the evolution of hydrogen gas, which, in some applications, may be objectionable and it is therefore advisable on this account to limit the quantity of cadmium to that beyond which further improvement is substantially negligible.

In a second embodiment of this invention there is introduced into the electrolyte, either prior to initial charge or at some later period a small quantity of zinc sulphate. It has been found that a quantity of zinc sulphate of from .1 to 50 milligrams of metallic zinc per square inch of negative plate surface will cause a reduction in local action at the negative electrode. It is found that the introduction of zinc in the quantities referred to will produce the same effect as the cadmium but to produce these beneficial results the charging rate must be increased. This may be objectionable in some applications and for this reason the introduction of cadmium is preferred.

The amount of cadmium or zinc referred to results in an exceedingly thin deposit of cadmium or zinc on the negative surfaces which does not materially effect the capacity of the cell but does increase the amount of stibine developed during charge and hence reduces contamination of the negative electrodes by antimony.

The fact that the deposited cadmium or zinc redissolves in the electrolyte to some degree during charge when stibine is produced and completely dissolves after the termination of the charge has the advantage of maintaining in the electrolyte the optimum concentration without further additions.

While a sulphate of either metal has been mentioned as a convenient compound for carrying out the invention, it will be understood that any compound of cadmium or zinc which is soluble in the sulphuric acid electrolyte and will not introduce an element injurious to the cell may be used, such as oxides, hydrates or carbonates, or even metallic cadmium or zinc. All of these will be converted to a sulphate by combination with the sluphuric acid electrolyte. It will, of course, be obvious to those familiar with the storage battery art that compounds with certain acid radicals injurious to the cell must be avoided.

It will be clear to one familiar with the science of electro-chemistry that the purpose of this invention is the production in the electrolyte of free cadmium or zinc ions capable of deposition on the negative electrode by the passage of electric current.

The effect of local action in a lead acid battery having antimonial lead grids may be determined in several different ways.

First, the drop in specific gravity of the electrolyte during an open circuit stand is a measure of the loss of capacity due to local action.

Second, the quantity of gas evolved during an open circuit stand is also a measure of the local action.

Third, the battery, after being fully charged, is allowed to stand on open circuit for a definite period of time, for example one week, and then discharged at a definite rate to a predetermined final voltage. The battery is then fully charged and then immediately discharged at the same rate to the same final voltage. The difference in capacity obtained on the two discharges is an indication of the loss of capacity due to local action during the open circuit stand, provided the capacity is limited by that of the negative plates.

The third test above outlined is not considered to be as accurate, quantitatively, as the other two.

In order to demonstrate the resulting reduction in the local action in a cell equipped with plates having grids of lead antimony alloy, during an open circuit stand, when a component is added in accordance with this invention, the following tests were made:

Three four-cell commercial batteries, assembled with plates having lead-antimony alloy grids and identical in every respect, were selected, designated batteries A, B and C. To the electrolyte in these batteries cadmium sulphate was added as follows, based on the amount of metallic cadmium per square inch of superficial area of negative plate surface, including both sides of each plate:

| Battery | Cadmium Addition |
|---|---|
| A | None. |
| B | 5 milligrams per sq. in. of neg. plate. |
| C | 10 milligrams per sq. in. of neg. plate. |

The same quantity of cadmium was added to each of the four cells, in each case. During the tests, the three batteries were subjected to identical treatment, that is, they were all charged in series for the same length of time and maintained at constant temperature in a water bath.

After bringing the batteries to a fully charged condition, the specific gravity of the electrolyte in each cell was determined and the average of the four cells of each battery was taken.

During the subsequent open circuit stand the temperature was maintained at 80° F., and the rate of gas evolution was measured after standing for 23, 42 and 90 hours, respectively. After a stand of 112.5 hours the specific gravities of the electrolyte were again taken. These figures, deducted from the original values, gave the drop in specific gravity during the stand, due to local action.

The results of this test are tabulated below, the gassing rates and specific gravity drops for batteries B and C being given in percentages of the corresponding value for battery A. The values given in the table are the average of the four cells in each case.

| Length of Stand | Gassing rates | | |
|---|---|---|---|
| | Battery A | Battery B | Battery C |
| Hours | Per cent | Per cent | Per cent |
| 23 | 100 | 54.9 | 49.9 |
| 42 | 100 | 53.1 | 45.9 |
| 90 | 100 | 57.7 | 52.9 |
| | Specific gravity drops | | |
| 112.5 | 100 | 61.2 | 45.2 |

From these results it will be observed that the local action of a cell as evidenced by gassing rate or gravity drop was approximately halved by the addition of the quantities of cadmium referred to when compared with the gassing rate or gravity drop of the standard untreated cell.

In the preferred embodiment of this invention cadmium or zinc is introduced into the electrolyte as a compound soluble in sulphuric acid. However, this invention is not limited thereto for the cadmium or zinc may be incorporated in or applied to as by spraying or plating any component of the cell such as the grid, separators, active material or container, either in the metallic form or as a compound of the metal. Cadmium or zinc thus introduced will by solution, leaching or corrosion eventually appear in the electrolyte in the desired proportions. Sufficient quantities must be incorporated in or applied to such components to insure a quantity in solution equivalent to the aforementioned range of .1 to 50 milligrams of metallic cadmium or zinc per square inch of negative plate surface.

While the theory of the beneficial effect of cadmium or zinc in reducing the local action of the negative plates resulting from the presence of antimony is not fully understood, a reasonable explanation is that during charge the cadmium or zinc in the electrolyte is deposited on the negative plate and possibly forms an alloy either with the antimony simultaneously deposited from the electrolyte or with the antimony already present in the negative plate. This alloy or the plated cadmium or zinc then goes into solution, the cadmium or zinc combining with the sulphuric acid to produce cadmium or zinc sulphate and nascent hydrogen, which latter combines with the antimony to produce stibine, $SbH_3$, which passes off in the form of gas. By this process the antimony deposited on the negative plate during charge is converted to stibine and the negatives are thereby maintained in better condition from a local action viewpoint.

I claim:

1. In a lead acid storage battery cell comprising positive and negative electrodes having grids containing antimony assembled with electrolyte in a suitable container, the improvement which consists in the incorporation in the cell in contact with the electrolyte of a soluble compound of a metal selected from the group consisting of cadmium and zinc in a quantity which will provide an amount of metal between the limits of 0.1 to 50 milligrams per square inch of negative electrode surface.

2. In a lead acid storage battery cell comprising positive and negative electrodes having grids containing antimony assembled with sulphuric acid electrolyte in a suitable container, the improvement which consists in the incorporation in the electrolyte of a soluble compound of a metal selected from the group consisting of cadmium and zinc in a quantity which will provide an amount of metal between the limits of 0.1 to 50 milligrams per square inch of negative electrode surface.

3. In a lead acid storage battery cell comprising positive and negative electrodes having grids containing antimony assembled with sulphuric acid electrolyte in a suitable container, the improvement which consists in the incorporation in the electrolyte of a soluble compound of cadmium in a quantity which will provide an amount of cadmium in the electrolyte of from 5 to 10 milligrams per square inch of negative electrode surface.

4. An electrolyte for a lead acid storage battery having lead antimony alloy grids comprising a dilute solution of sulphuric acid having incorporated therein a quantity of a metal selected from the group consisting of cadmium and zinc in the amount of from 0.1 to 50 milligrams of said metal per square inch of area of the negative electrodes of the battery in which said electrolyte is to be used.

5. The method of minimizing the effect of antimony as a local action producing agent at the negative electrode of a lead sulphuric acid storage battery having lead antimony alloy grids which comprises introducing into the battery in contact with the electrolyte thereof a metal selected from the group consisting of cadmium and zinc, said metal depositing on the negative electrode during charging of said battery, said metal redissolving in said electrolyte to produce nascent hydrogen which combines with available free antimony to form stibine whereby antimony is removed from said battery as stibine gas and said metal remains in solution in said electrolyte.

HAROLD PURVES MURPHY.

REFERENCES CITED

The following references are of record in the file of this patent:

UNITED STATES PATENTS

| Number | Name | Date |
| --- | --- | --- |
| 368,608 | Peyrusson | Aug. 23, 1887 |
| 370,134 | Flick | Sept. 20, 1887 |
| 623,195 | Werner | Apr. 18, 1899 |
| 1,034,887 | Deinlein | Aug. 6, 1912 |
| 1,517,660 | Williams | Dec. 2, 1924 |
| 1,826,724 | Booss et al. | Oct. 13, 1931 |
| 1,944,065 | Chamberlain | Jan. 16, 1934 |

FOREIGN PATENTS

| Number | Country | Date |
| --- | --- | --- |
| 209,749 | Great Britain | Jan. 10, 1924 |
| 6,829 | France | Jan. 17, 1907 |
| | (Addition No. 330,376 to Patent) | |

OTHER REFERENCES

Gillette, H. C.: Trans. Electrochemical Socy., vol. 41, (1922), pages 219, 220.

Vinal et al.: Trans. A. I. E. E., vol. 44 (1925), page 293.

Vinal: "Storage Batteries," third edition, 1940, John Wiley and Sons, Inc., New York, New York, publisher. Page 19 relied upon.